United States Patent
Dommaschk et al.

(10) Patent No.: US 8,233,300 B2
(45) Date of Patent: Jul. 31, 2012

(54) DEVICE FOR CONVERTING AN ELECTRIC CURRENT

(75) Inventors: Mike Dommaschk, Guteborn (DE); Jörg Dorn, Buttenheim (DE); Ingo Euler, Erlangen (DE); Jörg Lang, Stadtsteinach (DE); Dag Sörangr, Erlangen (DE); Quoc-Buu Tu, Rosstal (DE); Klaus Würflinger, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 480 days.

(21) Appl. No.: 12/517,818

(22) PCT Filed: Dec. 8, 2006

(86) PCT No.: PCT/DE2006/002248
§ 371 (c)(1),
(2), (4) Date: Aug. 19, 2009

(87) PCT Pub. No.: WO2008/067785
PCT Pub. Date: Jun. 12, 2008

(65) Prior Publication Data
US 2010/0118578 A1     May 13, 2010

(51) Int. Cl.
H02M 7/5387 (2007.01)
(52) U.S. Cl. .......................... 363/132; 363/127
(58) Field of Classification Search ............... 363/127, 363/132
See application file for complete search history.

(56) References Cited

U.S. PATENT DOCUMENTS

| | | | |
|---|---|---|---|
| 7,924,585 B2 * | 4/2011 | Sommer | 363/99 |
| 2010/0118578 A1 * | 5/2010 | Dommaschk et al. | 363/127 |

FOREIGN PATENT DOCUMENTS

| | | |
|---|---|---|
| DE | 2245680 A1 | 3/1974 |
| DE | 3335222 A1 | 4/1985 |
| DE | 4341868 A1 | 6/1994 |
| DE | 10345503 A1 | 4/2005 |
| JP | 6178546 A | 6/1994 |

OTHER PUBLICATIONS

Marquardt et al.: "New Concept for High Voltage—Modular Multi-level Converter", XP-02447362, 2004, pp. 1-5, Munchen, Germany, May 2009.
Lesnicar: "A new modular voltage source inverter topology", XP-002447361, pp. 1-10, München, Germany, May 2009.
Marquardt et al.: "Three-Phase Converter Arrangement Having Circulating Currents and Having Naturally Commutating Current Converters", XP-002447360, pp. 1-7, München, Germany, Nov. 1972.
Lesnicar et al.: "An innovative modular multilevel converter topology suitable for a wide power range", XP-002447365, pp. 1-6, Neubiberg, Germany, May 2009.

* cited by examiner

*Primary Examiner* — Jeffrey Sterrett
(74) *Attorney, Agent, or Firm* — Laurence A. Grrenberg; Werner H. Stemer; Ralph E. Locher

(57) ABSTRACT

A device for converting an electrical current includes at least one phase module with an AC voltage connection and at least one DC voltage connection, a phase module branch disposed between each DC voltage connection and the AC voltage connection and each phase module branch having a series circuit of submodules, each of which has an energy accumulator and at least one power semiconductor and closed-loop control means for regulating the device. The device can regulate circulating currents in a targeted manner by providing each phase module with at least one inductance and configuring the closed-loop control means to regulate a circulating current that flows through the phase modules.

5 Claims, 5 Drawing Sheets

DEVICE FOR CONVERTING AN ELECTRIC CURRENT

BACKGROUND OF THE INVENTION

Field of the Invention

The invention relates to a device for converting an electrical current with at least one phase module, which has an AC voltage connection and at least one DC voltage connection, a phase module branch being formed between each DC voltage connection and the AC voltage connection, and each phase module branch having a series circuit comprising submodules, which each have an energy storage device and at least one power semiconductor and with closed-loop control means for regulating the device.

Such a device is already known, for example, from the work by A. Lesnicar and R. Marquardt "An Innovative Modular Multilevel Converter Topology Suitable for a Wide Power Range", which appeared on Powertech 2003. This paper discloses a power converter, which is intended to be connected to an AC voltage system. The power converter has a phase module for each phase of the AC voltage system to be connected to it, each phase module having an AC voltage connection and two DC voltage connections. Phase module branches extend between each DC voltage connection and the AC voltage connection such that a so-called 6-pulse bridge circuit is provided. The module branches comprise a series circuit of submodules, which each comprise two disconnectable power semiconductors, with which in each case inverse freewheeling diodes are connected in parallel. The disconnectable power semiconductors and the freewheeling diodes are connected in series, with a capacitor being provided in parallel with said series circuit. Said components of the submodules are wired to one another such that either the capacitor voltage or the voltage zero drops across the two-pole output of each submodule.

The disconnectable power semiconductors are controlled by means of so-called pulse width modulation. The closed-loop control means for controlling the power semiconductors have measuring sensors for detecting currents whilst obtaining current values. The current values are supplied to a central control unit, which has an input interface and an output interface. A modulator, i.e. a software routine, is provided between the input interface and the output interface. The modulator has, inter alia, a selector unit and a pulse width generator. The pulse width generator generates the control signals for the individual submodules. The disconnectable power semiconductors are changed over from an on setting, in which a current flow via the disconnectable power semiconductors is made possible, to an off setting, in which a current flow via the disconnectable power semiconductors is interrupted, by means of the control signals generated by the pulse width generator. In this case, each submodule has a submodule sensor for detecting a voltage drop across the capacitor.

Further papers relating to the control method for a so-called multi-level power converter topology are those by R. Marquardt, A. Lesnicar, J. Hildinger "Modulares Stromrichterkonzept für Netzkupplungsanwendung bei hohen Spannungen" [Modular power converter concept for power supply system coupling application in the case of high voltages], presented at the ETG technical conference in Bad Nauenheim, Germany 2002, by A. Lesnicar, R. Marquardt, "A new modular voltage source inverter topology", EPE' 03 Toulouse, France 2003 and by R. Marquardt, A. Lesnicar "New Concept for High Voltage Modular Multilevel Converter", PESC 2004 Conference in Aachen, Germany.

The German patent application 10 2005 045 090.3, which is as yet unpublished, has disclosed a method for controlling a polyphase power converter with distributed energy storage devices. The disclosed device likewise has a multi-level power converter topology with phase modules, which have an AC voltage connection arranged symmetrically in the center of each phase module and two DC voltage connections. Each phase module comprises two phase module branches, which extend between the AC voltage connection and one of the DC voltage connections. In turn, each phase module branch comprises a series circuit of submodules, each submodule comprising disconnectable power semiconductors and freewheeling diodes connected back-to-back in parallel therewith. In addition, each submodule has a unipolar capacitor. Closed-loop control means are used for regulating the power semiconductors, which closed-loop control means are also designed to set branch currents which flow between the phase modules. By controlling the branch currents, current oscillations, for example, can be actively damped and operating points at lower output frequencies can be avoided. Furthermore, uniform loading of all of the disconnectable semiconductor switches and symmetrization of very asymmetrical voltages can be brought about.

The submodules of the phase modules generate in each case discrete output voltages, with the result that, given unequal voltage ratios between the phase modules, circulating currents can be brought about between the individual phase modules. These circulating currents are dependent on the ratio of the voltages applied to the inductances within the current path, in addition to the switching frequency at which the power semiconductors are switched. At low switching frequencies of below 200 Hz, the circulating currents can barely be managed in terms of regulation technology in the case of small inductances and cannot be avoided.

BRIEF SUMMARY OF THE INVENTION

The object of the invention is therefore to provide a device of the type mentioned at the outset with which circulating currents can be controlled and reduced in a targeted manner.

This object is achieved according to the invention by virtue of the fact that each phase module has at least one inductance, the closed-loop control means being designed to regulate a circulating current, which flows via the phase modules.

According to the invention, each phase module has at least one inductance. The inductances are designed such that targeted regulation of the circulating currents is made possible by means of the closed-loop control means. In other words, the inductances are matched to the respectively present conditions, such as the DC voltage applied, the AC voltage applied or the like. The regulation predetermines desired circulating voltage setpoint values, which are applied during the regulation of the associated phase module branch as the setpoint value, for example other setpoint voltages of the phase module branch affected, and thus ensure a desired circulating current. In this case, the regulation advantageously has a current regulator and an associated drive unit for each phase module branch. The current regulator is connected to the submodules of the respective phase module branch only via the drive unit, but not directly. In this case, the current regulator generates, for example, a branch voltage setpoint value, which is made available to the drive unit. The drive unit provides control signals, which are supplied to the disconnectable power semiconductors of the submodules, with the result that a total voltage drop across the submodules of the associated phase module branch corresponds to the branch setpoint voltage as precisely as possible. The application of the circulating voltage setpoint values to other setpoint voltages of the respective phase module branch takes place by means of the current regulator, which combines said setpoint values with one another in linear fashion, i.e. by means of summation and/or subtraction. The result of this linear combination is branch voltage setpoint values, which are each associated with a phase module branch.

Since each phase module branch has an identical inductance, the required symmetry in terms of regulation technology is provided.

Advantageously, each phase module branch is connected to the AC voltage connection via an inductance. According to this expedient development, the AC voltage connection is arranged between two inductances.

In accordance with a development which is expedient in this regard, the inductances of the phase module are coupled to one another. The coupling increases the total inductance, with the result that the individual inductances in terms of their values, i.e. their inductance, can be correspondingly lowered. In this way, costs are saved. In other words, smaller inductors or coils can be used in the phase module. The total inductance achieved by the coupling in addition affects only the circulating currents and at best the DC components of the phase module branch currents. The inductance for AC-side phase currents is reduced by the coupling of the inductances, however.

The coupling of the inductances can take place via air, via an iron core or the like.

BRIEF DESCRIPTION OF THE SEVERAL VIEWS OF THE DRAWING

Further advantages and configurations are the subject matter of the description below relating to exemplary embodiments of the invention with reference to the figures in the drawing, in which identical reference symbols relate to functionally identical component parts and in which.

DESCRIPTION OF THE INVENTION

Figure 1:
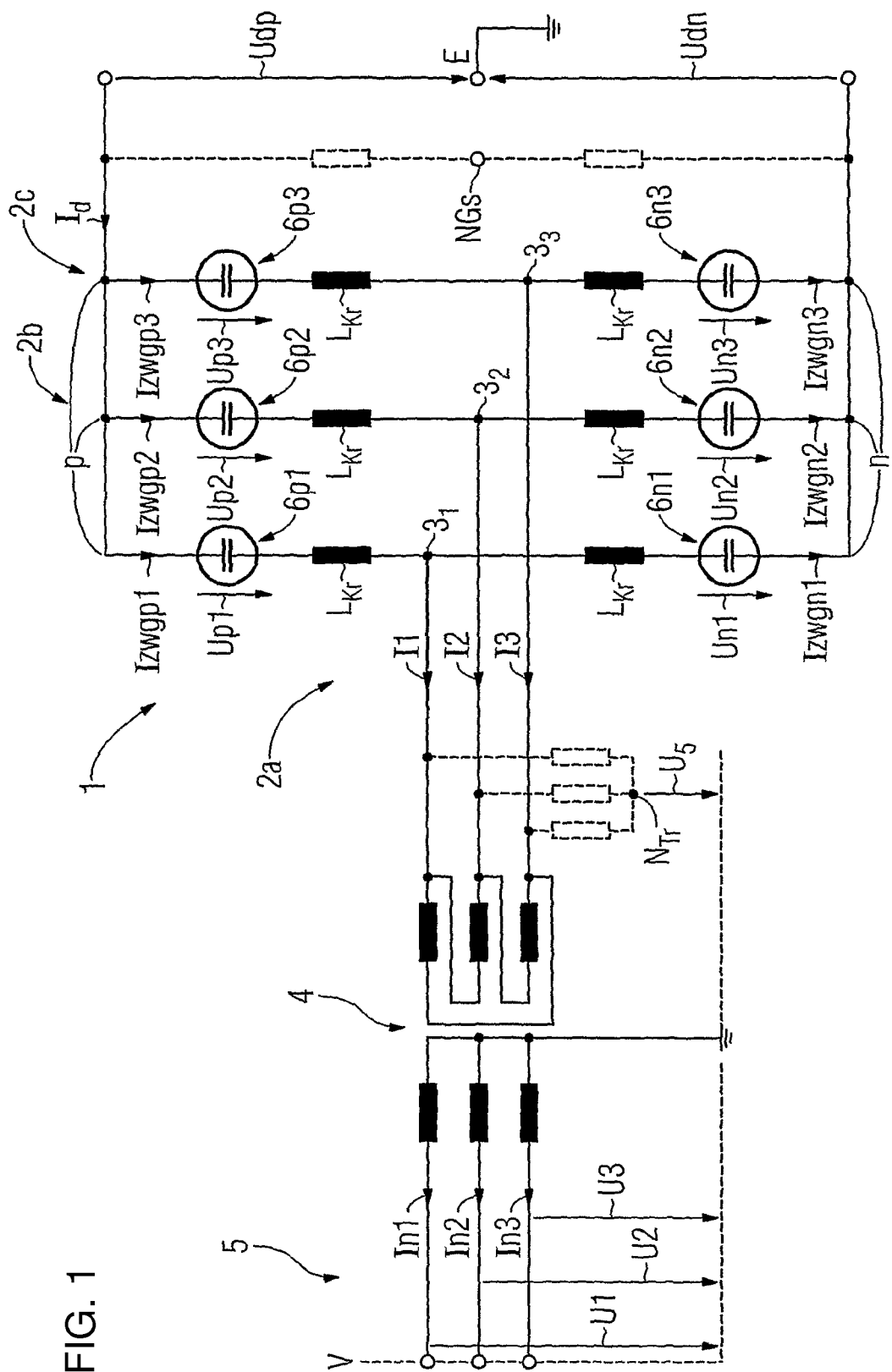
FIG. 1 shows an exemplary embodiment of a device according to the invention in a schematic illustration.

FIG. 1 shows an exemplary embodiment of the device 1 according to the invention which comprises three phase modules 2a, 2b and 2c. Each phase module 2a, 2b and 2c is connected to a positive DC voltage line p and to a negative DC voltage line n, with the result that each phase module 2a, 2b, 2c has two DC voltage connections. In addition, in each case one AC voltage connection $3_1$, $3_2$ and $3_3$ is provided for each phase module 2a, 2b and 2c. The AC voltage connections $3_1$, $3_2$ and $3_3$ are connected to a three-phase AC voltage system 5 via a transformer 4. The phase voltages U1, U2 and U3 drop across the phases of the AC voltage system 5, with system currents In1, In2 and In3 flowing. The AC-voltage-side phase current of each phase module is denoted by I1, I2 and I3. The DC voltage current is $I_d$. Phase module branches 6p1, 6p2 and 6p3 extend between each of the AC voltage connections $3_1$, $3_2$ or $3_3$ and the positive DC voltage line p. The phase module branches 6n1, 6n2 and 6n3 are formed between each AC voltage connection $3_1$, $3_2$, $3_3$ and the negative DC voltage line n. Each phase module branch 6p1, 6p2, 6p3, 6n1, 6n2 and 6n3 comprises a series circuit of submodules (not illustrated in detail in FIG. 1) and an inductance, which is denoted by $L_{Kr}$ in FIG. 1.

Figure 2:
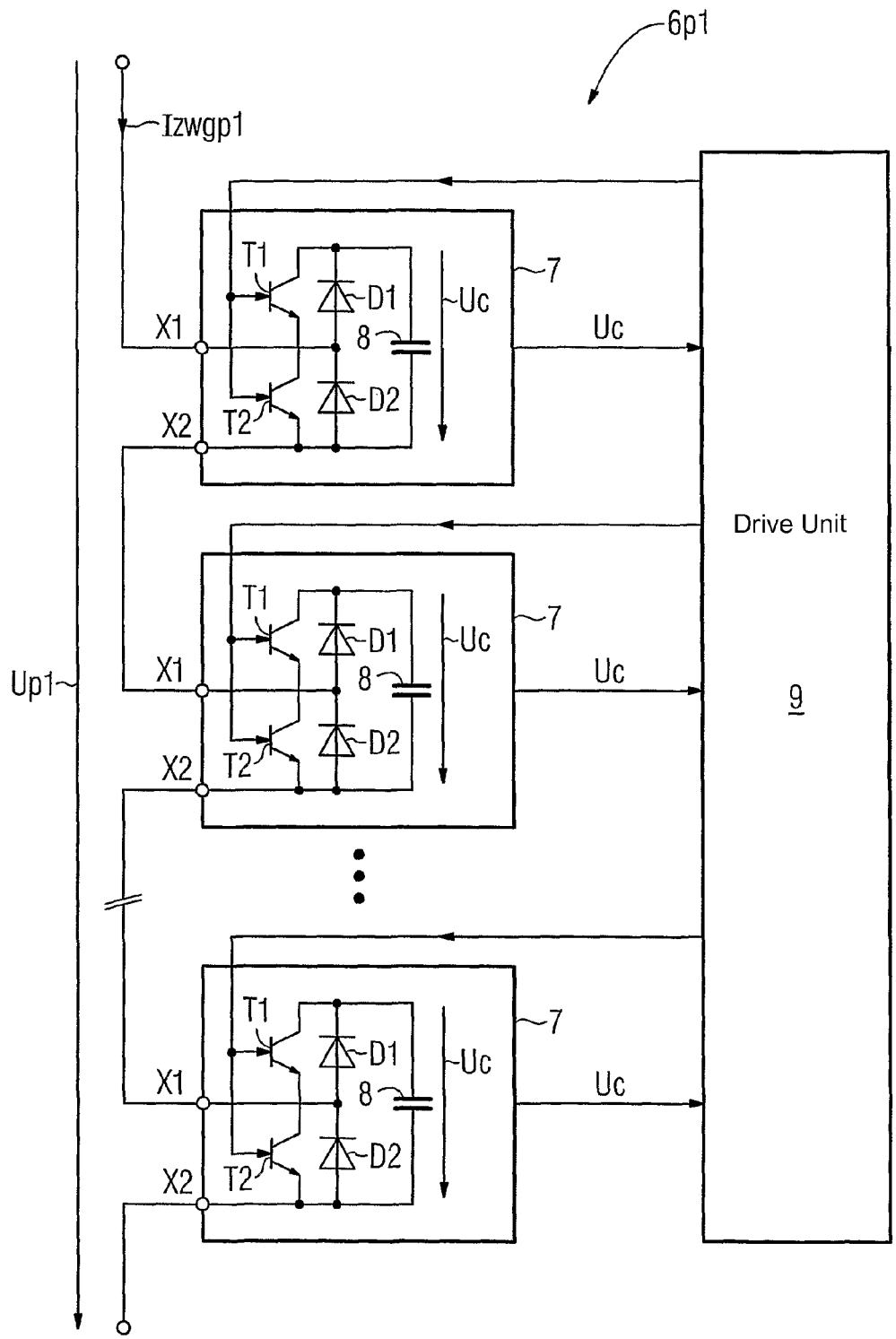
FIG. 2 shows an equivalent circuit diagram of a submodule of a device as shown in FIG. 1.

FIG. 2 illustrates the series circuit of the submodules 7 and in particular the design of the submodules by means of an electrical equivalent circuit diagram in more detail, with only the phase module branch 6p1 being singled out in FIG. 2. The rest of the phase module branches have an identical design, however. It can be seen that each submodule 7 has two disconnectable power semiconductors T1 and T2 connected in series. Disconnectable power semiconductors are, for example, so-called IGBTs, GTOs, IGCTs or the like. They are known to a person skilled in the art as such, with the result that a detailed illustration is not required at this juncture. A freewheeling diode D1, D2 is connected back-to-back in parallel with each disconnectable power semiconductor T1, T2. A capacitor 8 is connected as the energy storage device in parallel with the series circuit of the disconnectable power semiconductors T1, T2 or the freewheeling diodes D1 and D2. Each capacitor 8 is charged in unipolar fashion. Two voltage states can now be generated at the two-pole connection terminals X1 and X2 of each submodule 7. If, for example, a drive signal is generated by a drive unit 9, with which drive signal the disconnectable power semiconductor T2 is changed over into its on setting, in which a current flow via the power semiconductor T2 is made possible, the voltage drop across the terminals X1, X2 of the submodule 7 is zero. In this case, the disconnectable power semiconductor T1 is in its off setting, in which a current flow via the disconnectable power semiconductor T1 is interrupted. This prevents the discharge of the capacitor 8. If, on the other hand, the disconnectable power semiconductor T1 is changed over to its on setting, but the disconnectable power semiconductor T2 is changed over to its off setting, the full capacitor voltage Uc is present at the terminals X1, X2 of the submodule 7.

The exemplary embodiment of the device according to the invention shown in FIGS. 1 and 2 is also referred to as a so-called multi-level power converter. Such a multi-level power converter is suitable, for example, for driving electrical machines, such as motors or the like, for example. Furthermore, such a multi-level power converter is also suitable for use in the sector of energy distribution and transmission. Thus, the device according to the invention is used, for example, as a back-to-back link, which comprises two power converters which are connected to one another on the DC-voltage side, the power converters each being connected to an AC voltage system. Such back-to-back links are used for the exchange of energy between two energy distribution systems, the energy distribution systems having, for example, a different frequency, phase angle, neutral-point connection or the like. Furthermore, applications in the field of wattless power compensation as so-called FACTS (Flexible AC Transmission Systems) come into consideration. High-voltage DC transmission over long distances is also conceivable with such multi-level power converters.

The inductances $L_{Kr}$ are used for limiting the currents flowing via the respective phase module and therefore for protecting the disconnectable power semiconductors T1, T2 and the freewheeling diodes D1 and D2 of the submodules 7 from overcurrents. In the context of the invention, however, the respective inductance is selected to be so high that active regulation of the circulating currents which flow between the phase modules is made possible. In the context of the invention, therefore, inductances are required which are higher than those which are sufficient merely for protecting the power semiconductors. Furthermore, a symmetrical distribution of the inductances over the phase module branches with a view to regulation is advantageous.

Figure 3:
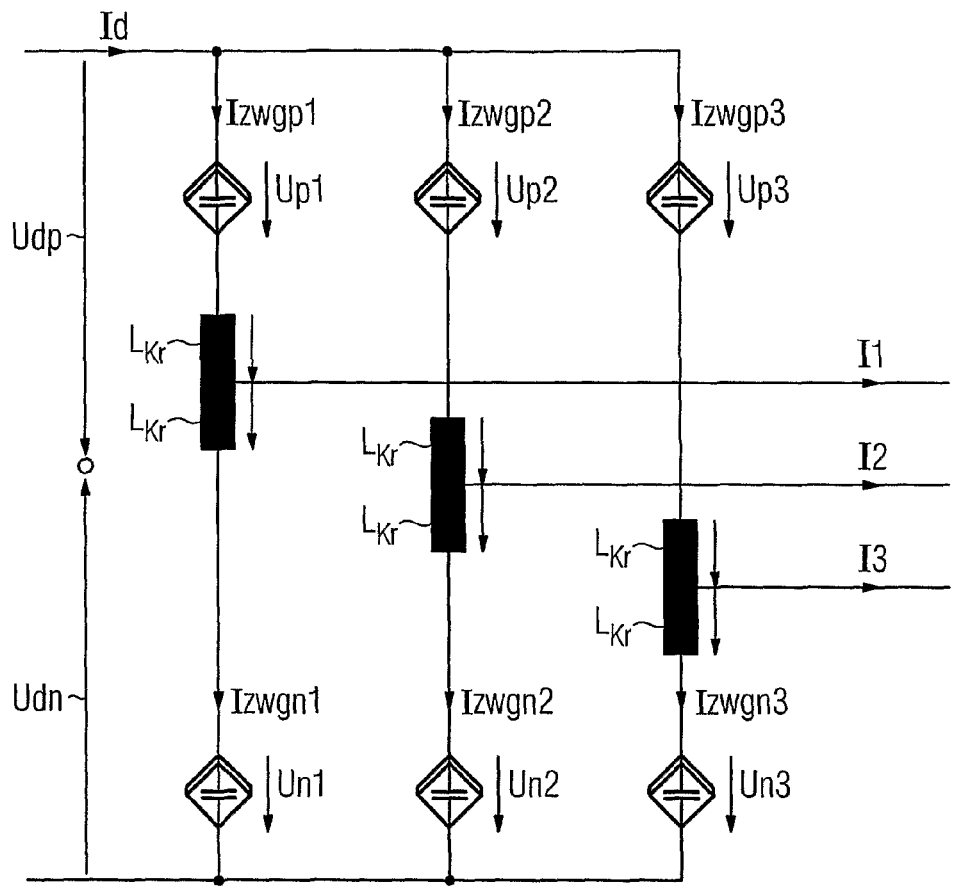
FIG. 3 shows the device shown in FIG. 1 with coupled inductances.
Figure 4:
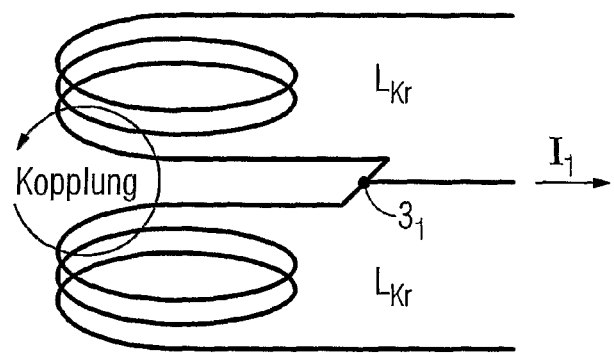
FIG. 4 shows an enlarged illustration of the coupling of the inductances.

FIG. 3 shows the device shown in FIG. 1, but with the inductances $L_{Kr}$ of a phase module being coupled to one another. As a result of this coupling, the inductances may be lower than in the exemplary embodiment shown in FIG. 1 given the same rated voltages and the same use conditions. In other words, the coupling provides the possibility of reducing the inductors or coils required for construction in terms of their physical size and the rest of their configuration. On the basis of a coupling factor K for the magnetic coupling, the following results for the effective inductance of a phase module branch in the circulating current direction $L_K$:

$$L_K = L_L(1+K),$$

where $L_L$ corresponds to the inductance of the sum of the individual inductances which are not coupled to one another. The phase module branch currents comprise, in addition to the circulating currents, DC current components and phase currents I1, I2 and I3 flowing between the AC voltage connections $3_1$, $3_2$, $3_3$ and the connected AC voltage system. An increased inductance results only for the DC components and the circulating currents. The inductance $L_{CONV}$ for the phase currents I1, I2 and I3 is reduced, however, by the coupling in accordance with $$L_{CONV} = L_L(1-K).$$

In this way, circulating currents can be reduced and can be supplied for active regulation. The coupling can take place via air, but also via an iron core or the like. In the case of air-core inductors, coupling factors of up to 20% can be produced. In addition to the damping of the circulating currents, the coupled inductances also ensure improved splitting of the phase currents into identical components between the phase module branches of the same phase module.

Figure 5:
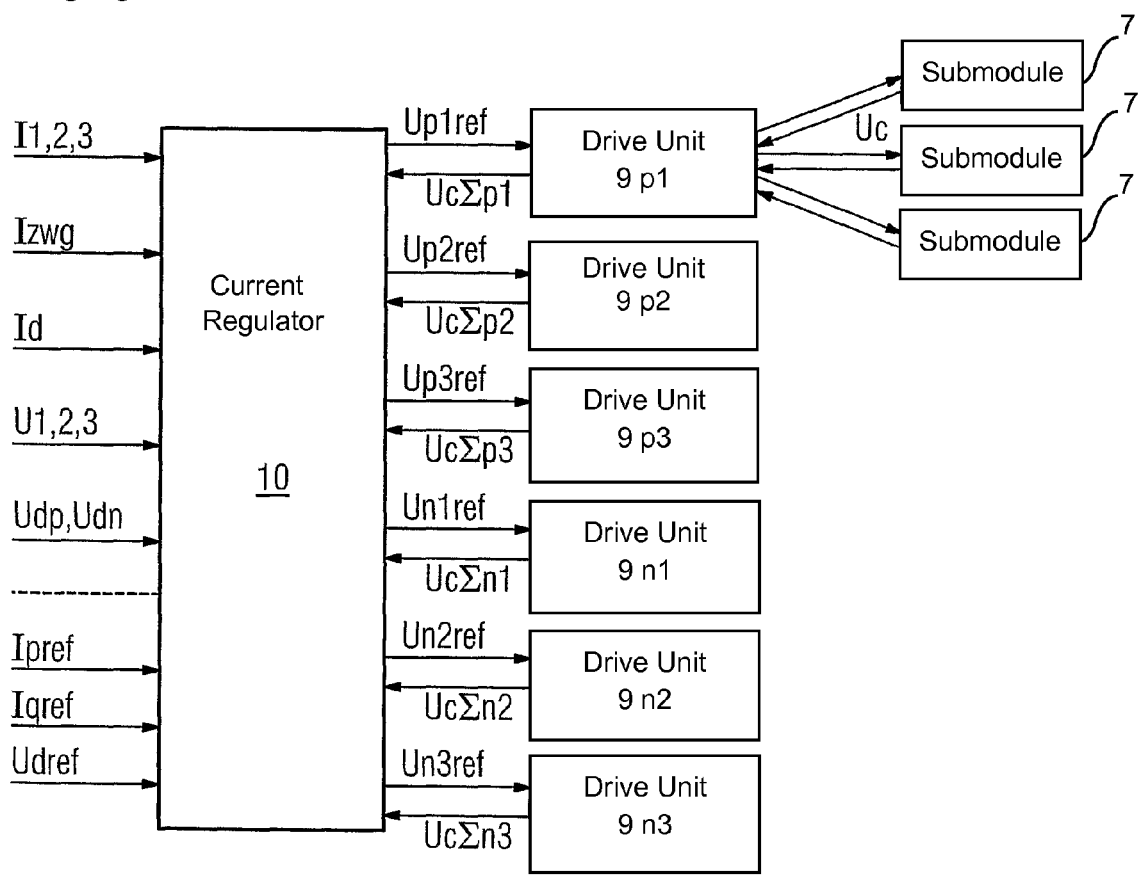
FIG. 5 shows the structure of the closed-loop control means of the device shown in FIG. 1.

FIG. 5 illustrates the structure of the closed-loop control means. The closed-loop control means comprise a current regulator 10 and drive units 9p1, 9p2, 9p3 and 9n1 and 9n2 and 9n3. Each of the drive units is associated with a phase module branch 6p1, 6p2, 6p3, 6n1, 6n2 and 6n3, respectively. The drive unit 9p1 is, for example, connected to each submodule 7 of the phase module branch 6p1 and generates the control signals for the disconnectable power semiconductors T1, T2. A submodule voltage sensor (not illustrated in the figures) is provided in each submodule 7. The submodule voltage sensor is used for detecting the capacitor voltage drop across the capacitor 8 as the energy storage device of the submodule 7 whilst obtaining a capacitor voltage value Uc. The capacitor voltage value Uc is made available to the respective drive unit, in this case 9p1. The drive unit 9p1 therefore obtains the capacitor voltage values of all of the submodules 7 of the phase module branch 6p1 associated with it and summates these values to obtain a branch energy actual value or in this case branch voltage actual value UcΣp1, which likewise is associated with the phase module branch 6p1. This branch voltage actual value UcΣp1 is supplied to the current regulator 10.

Moreover, the current regulator 10 is connected to various measuring sensors (not illustrated in the figures). Thus, current transformers arranged on the AC-voltage side of the phase modules 2a, 2b, 2c are used to generate and supply phase current measured values I1, I2, I3 and current transformers arranged at each phase module are used to generate and supply phase module branch currents Izwg and a current transformer arranged in the DC voltage circuit of the power converter is used to provide DC current measured values Id. Voltage transformers of the AC system provide system voltage measured values U1, U2, U3 and DC voltage transformers provide positive DC voltage measured values Udp and negative DC voltage measured values Udn, the positive DC voltage values Udp corresponding to a DC voltage drop between the positive DC voltage connection p and ground, and the negative DC voltage values Udn corresponding to a voltage drop between the negative DC voltage connection and ground.

The current regulating unit 10 is also supplied setpoint values. In the exemplary embodiment shown in FIG. 5, the regulating unit 10 is supplied an active current setpoint value Ipref and a wattless current setpoint value Iqref. In addition, a DC voltage setpoint value Udref is applied to the input of the current regulating unit 10. Instead of a DC voltage setpoint value Udref, the use of a DC setpoint value Idref is also possible in the context of the invention.

The setpoint values Ipref, Iqref and Udref and said measured values interact with one another when using different regulators, with a branch voltage setpoint value Up1ref, Up2ref, Up3ref, Un1ref, Un2ref, Un3ref being generated for each drive unit 9p1, 9p2, 9p3, 9n1, 9n2 and 9n3. Each drive unit 9 generates control signals for the submodules 7 associated with it, with the result that the voltage drop Up1, Up2, Up3, Un1, Un2, Un3 across the series circuit of the submodules corresponds to the respective branch voltage setpoint value Up1ref, Up2ref, Up3ref, Un1ref, Un2ref, Un3ref as far as possible.

The current regulator 10 forms suitable branch voltage setpoint values Up1ref, Up2ref, Up3ref, Un1ref, Un2ref, Un3ref from its input values.

Figure 6:
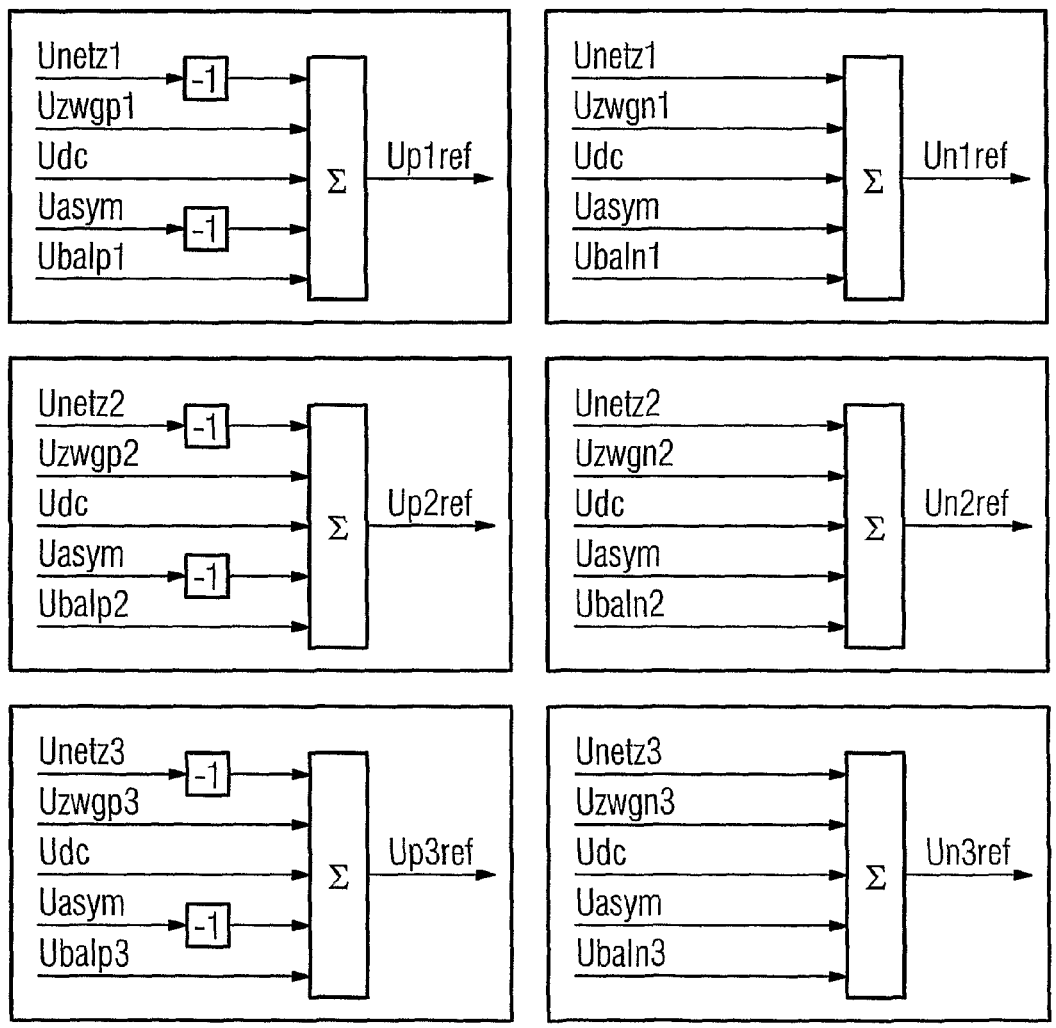
FIG. 6 shows the application of circulating voltage setpoint values to other setpoint values of the closed-loop control means.

FIG. 6 shows that, for example, the branch voltage setpoint value Upref is calculated by linear combination of a system phase voltage setpoint value Unetz1, a branch voltage intermediate setpoint value Uzwgp1, a DC voltage setpoint value Udc, a symmetrizing voltage setpoint value Uasym and a balancing voltage setpoint value Ubalp1. This takes place for each of the phase module branches 6p1, 6p2, 6p3, 6n1, 6n2, 6n3 independently of one another. The circulating currents can be set in a targeted manner using the branch voltage intermediate setpoint values Uzwg in conjunction with the set branch inductances. The balancing voltage setpoint values Ubal are also used for compensating for asymmetries as regards the energies stored in the phase module branches 6p1, 6p2, 6p3, 6n1, 6n2, 6n3.

The invention claimed is:

1. A device for converting an electrical current, the device comprising:
    at least one phase module each having an AC voltage connection, at least one DC voltage connection, at least one phase module branch respectively disposed between each said at least one DC voltage connection and said AC voltage connection, and at least one inductance;
    each said at least one phase module branch having a series circuit including submodules each having an energy storage device, and at least one power semiconductor; and
    a closed-loop control device for regulating the device, said closed-loop control device regulating a circulating current flowing between each said at least one phase module branch on a closed current path.

2. The device according to claim 1, wherein each said at least one phase module branch is connected to said AC voltage connection through said respective at least one inductance.

3. The device according to claim 1, wherein said at least one inductance of a phase module is a plurality of inductances coupled to one another.

4. The device according to claim 3, wherein said inductances are coupled to one another through air.

5. The device according to claim 3, which further comprises an iron core through which said inductances are coupled to one another.

* * * * *